(12) United States Patent
Gretz

(10) Patent No.: US 6,585,221 B1
(45) Date of Patent: Jul. 1, 2003

(54) GARDEN POST

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/253,185

(22) Filed: Sep. 24, 2002

Related U.S. Application Data

(63) Continuation-in-part of application No. 10/112,563, filed on Mar. 28, 2002, which is a continuation-in-part of application No. 09/860,064, filed on May 17, 2001.

(51) Int. Cl.[7] .............................................. F16M 13/00
(52) U.S. Cl. ...................................... 248/545; 248/156
(58) Field of Search ................................ 248/156, 530, 248/545, 85, 87; 362/431, 382

(56) References Cited

U.S. PATENT DOCUMENTS

| | | | | |
|---|---|---|---|---|
| 3,011,598 A | * | 12/1961 | Galloway et al. ............. 189/30 |
| 3,435,124 A | | 3/1969 | Channell ..................... 174/38 |
| 3,716,347 A | * | 2/1973 | Bergstrom et al. ......... 29/182.2 |
| 3,831,891 A | * | 8/1974 | Jester .......................... 248/44 |
| 4,507,715 A | * | 3/1985 | Wedding ..................... 362/153 |
| 4,519,657 A | | 5/1985 | Jensen ......................... 339/15 |
| 4,774,648 A | | 9/1988 | Kakuk et al. ............... 362/302 |
| 4,785,376 A | * | 11/1988 | Dively ........................ 361/334 |
| 4,858,877 A | | 8/1989 | Carter ......................... 248/545 |
| 4,914,258 A | * | 4/1990 | Jackson .................... 174/45 R |
| 5,231,562 A | * | 7/1993 | Pierce et al. ................ 361/428 |
| 5,255,810 A | * | 10/1993 | Hosford ...................... 220/243 |
| 5,586,742 A | | 12/1996 | Carter ......................... 248/545 |
| 5,641,939 A | * | 6/1997 | Tourigny .................. 174/45 R |
| 5,820,255 A | * | 10/1998 | Carrington et al. ......... 362/431 |
| D424,524 S | * | 5/2000 | Guercio ..................... D13/154 |
| 6,064,005 A | * | 5/2000 | Raasch ......................... 174/66 |
| D430,942 S | * | 9/2000 | Schuster .................... D25/126 |
| 6,303,863 B1 | * | 10/2001 | Raasch ......................... 174/66 |

* cited by examiner

Primary Examiner—Anita King
Assistant Examiner—Steven Marsh

(57) ABSTRACT

A garden post enabling the mounting of fixtures and electrical devices at a variety of user-selected heights in an outdoor setting. A top member includes a junction box for accepting wiring connections for a fixture, a box-mounted electrical device, or some combination of the two. A base member includes a large entryway to allow lead in of electrical cables and radial projections to enhance anchoring to the ground. Securing the top member directly to the base member provides a short garden post. One or more extenders may be inserted between the top and base members of the garden post to raise the height. The garden post may be used for mounting fixtures and devices that are typically used in a landscape setting such as lights, cameras, photocells, motion detectors, receptacles, ground fault circuit interrupters, switches, and other similar devices. A service portal provides access to the outlet box from one side of the post and is typically provided with a removable cover that is secured thereto. After wiring connections are completed within the box and a cover plate attached thereto, the garden post provides a durable, weatherproof enclosure for fixtures and electrical devices.

19 Claims, 10 Drawing Sheets

GARDEN POST

This application is a Continuation-In-Part of U.S. patent application Ser. No. 10/112,563 entitled "Outdoor Garden Post", filed Mar. 28, 2002 and still pending, which in turn is a Continuation-In-Part of U.S. patent application Ser. No. 09/860,064 entitled "Landscape Fixture Support Post", filed May 17, 2001 and still pending.

FIELD OF THE INVENTION

The present invention relates to the field of outdoor ground-level fixtures and electrical devices, and more particularly to a modular enclosure that enables easy installation of fixtures in the landscape at a variety of user-selected heights.

BACKGROUND OF THE INVENTION

It is well known to mount various lights and other fixtures outdoors in order to provide illumination or other decorative effects to a landscape. Various devices for mounting such lights and fixtures have been proposed. Most of these proposed devices are of a fixed dimension and therefore limit the installation of the fixture to only one preselected height. Often, however, a landowner may desire light fixtures, for example, in various areas of the landscape. It may be desired, for example, to mount light fixtures along a path through a yard. In some sections along the path, such as turf areas, the landowner may desire a low mounted fixture to make the fixture less obvious during the daytime. In other sections, such as shrub areas, the landowner may desire a light fixture that is mounted at a height to provide illumination above the shrub tops. A need therefore exists for a device to allow mounting of fixtures at various heights, selectable by the user, in an outdoor setting. The device should be easy to install, provide a solid anchor to the ground, stable, durable, inexpensive, and easy to maintain. The fixture-mounting device should also provide an UL-listed junction box to enable separation of the wiring connections from proximity to the ground and thereby provide protection against ground moisture and insects.

A parent application to this Continuation-In-Part application, U.S. patent application Ser. No. 10/112,563, disclosed a mounting device for mounting a fixture in an outdoor setting. The outdoor garden post of U.S. Ser. No. 10/112,563 however, was limited to mounting a fixture or a device at a single height above the ground level. What is needed is a device that is adaptable to enable mounting of fixtures at various heights in a landscape setting. The device should provide a secure junction box to isolate wiring from environmental hazards, provide a solid anchor to the ground, provide easy access for underground cables to enter the device, and exhibit the characteristics of being stable, durable, inexpensive, easy to install, and easy to maintain.

OBJECTS OF THE INVENTION

A first advantage of the present invention is that it provides a fixture-mounting device that may be easily inserted in the ground and is able to support fixtures at various heights above the ground surface.

Additionally, the fixture-mounting device provides a weatherproof box for holding and protecting wiring connections. The box is an Underwriters Labs (UL) listed box that provides for easy mounting of electrical devices such as electrical receptacles and switches.

An additional advantage is that the fixture-mounting device provides an arrangement for easily mounting a light fixture. Either low voltage or line voltage fixtures may be used.

Additionally, the fixture-mounting device is stable, durable, easily maintained and accessed after installation, and is easy and inexpensive to manufacture.

Another advantage exhibited by the fixture-mounting device of the present invention is that it is easily installed and adapted to different heights by a homeowner.

These, and other objects, will become readily apparent to one of skill in the art having regard for this disclosure.

BRIEF DESCRIPTION OF THE INVENTION

The invention is a fixture-mounting device that is modular in nature and provides a means of supporting a fixture or box-mounted electrical device above the ground. The device includes a top member for accepting a fixture, a box-mounted electrical device, or a combination of each. A base member includes a large entryway to allow lead in of electrical cables into the device and radial projections for secure anchoring to the ground. One or more extenders may be included to increase the height of the device. A low mounting post for mounting a fixture and/or box-mounted electrical device may be created by securing the top and base members together. A post of intermediate height may be created by securing an extender between the top and base members. Additional extenders may be added to further extend the height of fixture.

The fixture-mounting device, or garden post, may be used for mounting devices that are typically used in a landscape surrounding such as lights, cameras, photocells to control lighting, and other similar devices. An UL-listed electrical box is provided within the top member for housing electrical receptacles, switches, ground fault circuit interrupters ("GFCI's") or similar devices that typically are secured within an UL-listed box.

In a preferred embodiment a top member, extender, and base member may be secured together to form a garden post of intermediate height. Secured thus, the members comprise an elongated body of square cross section having a top and a bottom end. The top end protrudes from the ground and includes an aperture through which various devices may be mounted or connected. The bottom end is tapered to provide a large entryway for leading electrical cables into the enclosure. The assembled garden post is essentially hollow but with a portion near the top closed off to provide an UL-listed electrical outlet box. A service portal provides access to the outlet box from one side of the post and is typically provided with a removable cover that is secured thereto.

REFERENCE NUMERALS USED IN THE SPECIFICATION AND DRAWINGS

Figure 1:
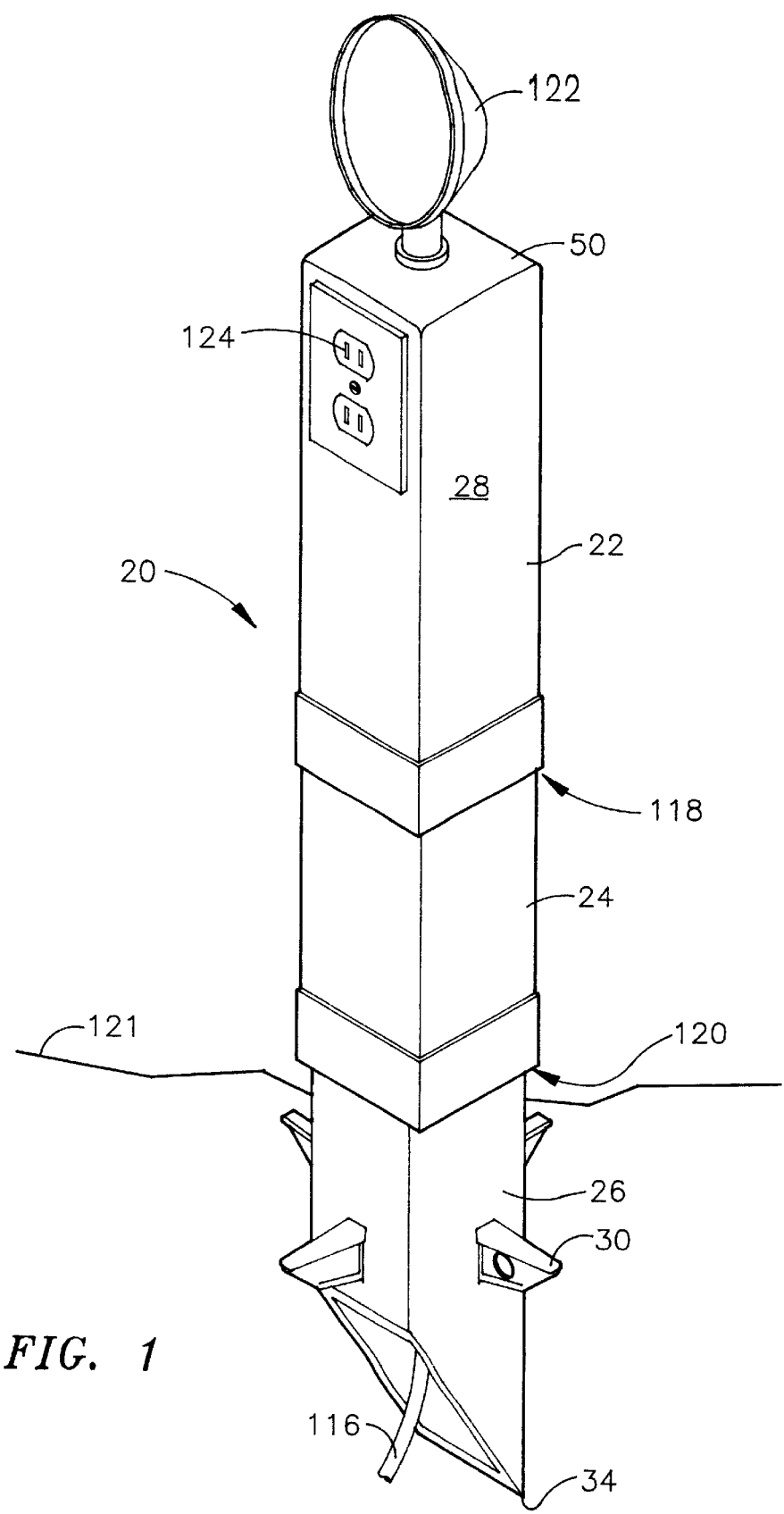
FIG. 1 is a perspective view of a preferred embodiment of the garden post of the present invention configured for an intermediate height and including a light fixture and a duplex receptacle.

20 —garden post of intermediate height
22 —top member
24 —extender
26 —base member
28 —side walls
28A —front side
30 —radial projections
31 —aperture (in radial projection)
32 —top end of base member
33 —thicker body portion
34 —bottom end of base member
35 —fillet
36 —top edge of base member
37 —sharpened lower edge of radial projection
38 —sloped bottom edge of base member
39 —distal end of radial projection
40 —cable entryway
42 —top end of extender
44 —bottom end of extender
46 —extender collar
48 —bottom end of top member
50 —top end of top member
52 —top member collar
54 —access portal
56 —shelf
58 —junction box
60 —wall sections
62 —aperture (to accept device fastener)
64 —device fastener
66 —duplex receptacle
68 —aperture (to accept cover fastener)
70 —cover fastener
72 —cover plate
74 —top wall
76 —aperture (to accept light fixture or bushing)
78 —inner wall
80 —bushing
82 —nut
83 —bushing gasket
84 —ground wire
85 —grounding lug
86 —cap
88 —cap nut
90 —knockout
92 —inner end of shelf
94 —outer end of shelf
96 —thin walled bridge
98 —lip
100 —boss
102 —coaxial apertures (to accept shelf fasteners)
104 —gap
106 —short garden post
108 —cover gasket
110 —shelf fasteners
112 —inner walls of flared portion of extender
114 —inner walls of flared portion of top member
116 —cable
118 —top joint
120 —bottom joint
121 —ground level
122 —light fixture
124 —duplex receptacle
126 —photocell

DETAILED DESCRIPTION

As this invention may be more easily explained by reference to the attached drawings, it should be noted that the figures are representative and exemplary of the invention only, and should not be construed as limiting the scope of the invention in any way.

The garden post of the present invention is an apparatus that may be used to provide electrical service in a landscape setting. The garden post is suitable for a wide range of fixtures and electrical devices that are typically mounted in a landscape. Such fixtures and electrical devices include, but are not limited to, lighting fixtures, sensors such as rain gauges, light sensors, motion sensors, and infrared sensors, cameras, microphones, receptacles, switches, ground fault circuit interrupt (GFCI) receptacles, and vibration detectors. The garden post of the present invention is modular in nature, consisting of a top member and a base member, and may include one or more extenders to increase the height of the fixture or electrical device above the landscape. A stable, easily serviceable, attractive mounting platform is desirable for many applications, and the present invention provides such a platform that is also inexpensive to produce and weather resistant.

Referring now to FIG. 1, an outdoor garden post of intermediate height 20 according to the present invention is shown. The preferred embodiment of the garden post of intermediate height 20 is comprised of a top member 22, an extender 24, and a base member 26. The top member 22, extender 24, and base member 26 are typically rigid, hollow, and formed in an injection molding process with a sufficient wall thickness to support the combined fixture and make it sturdy enough to resist lawn mowers or similar equipment when mounted in the ground. A presently preferred material for forming the body is plastic such as polyvinyl chloride (PVC), polycarbonate, acrylonitrile-butadiene styrene (ABS), or polyethylene. Other materials may be used for construction of the body as well, such as metal. Preferably, the four side walls 28 are from 0.1 to 0.5 inch thick. A preferred embodiment formed of polycarbonate or polyvinyl chloride is more preferably 0.15 to 0.25 inch thick. It is desired to keep the wall thickness as thin as possible while still providing the proper strength and rigidity for the assembled garden post, as the device will be less expensive to produce. By providing a top member 22, extender 24, base member 26, and a cover formed by injection molding of a pigmented plastic, the elongated body does not exhibit discoloration from chipping. Therefore, the body and cover have the advantage of not showing chips and dents from accidental bumps by lawn mowers, yard tools, and the like.

Figure 2:
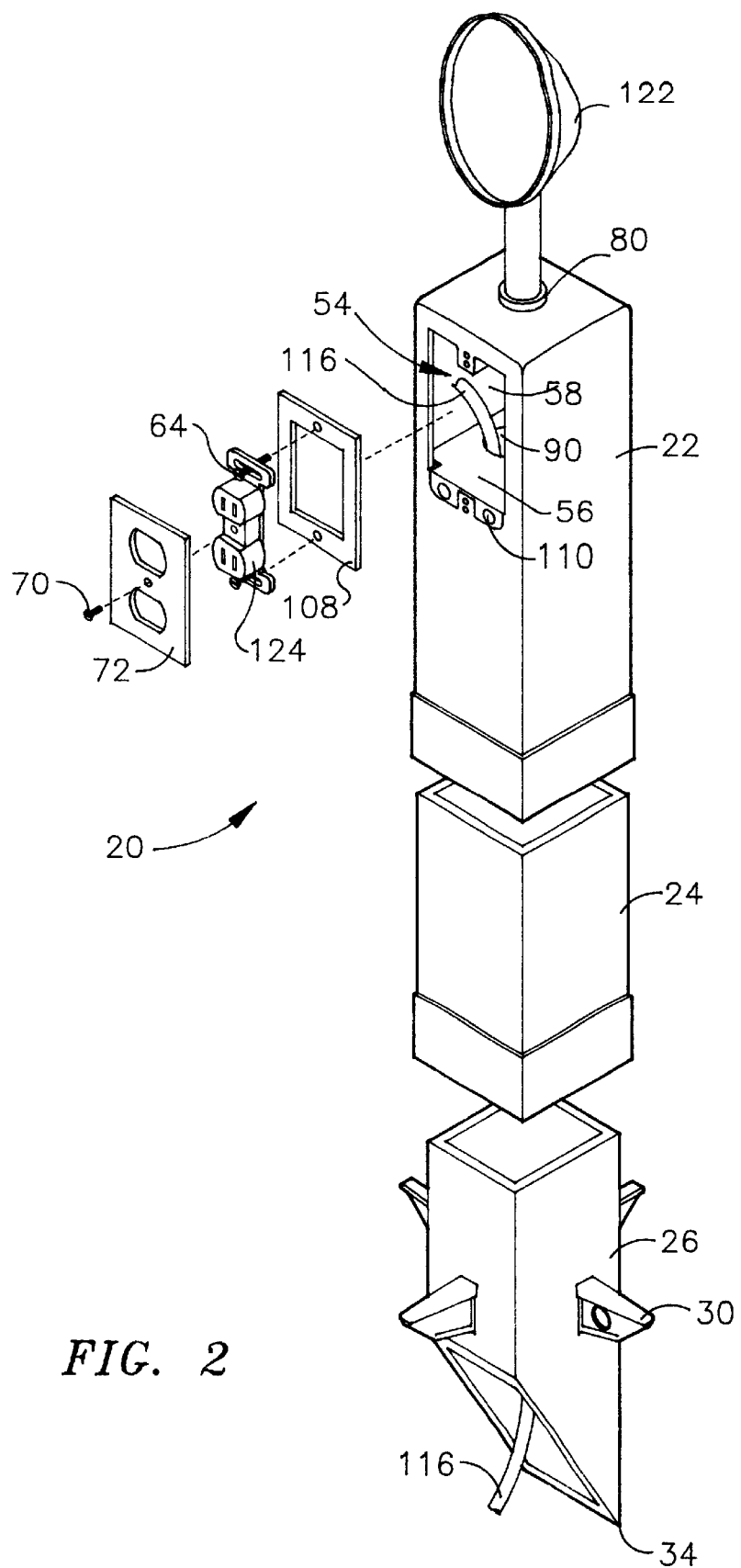
FIG. 2 is an exploded perspective view of the top member, extender, and base member along with a light fixture and cover.

As shown in FIG. 2, the top member 22, extender 24, and base member 26 are assembled and secured together, typically with a solvent cement, to form a secure bond between the various pieces. If the various members are molded of PVC, a PVC solvent cement would typically perform a weld much like the weld on metal pipes. When the solvent cement is applied to each adjacent piece, the plastic surfaces are softened and meld together. Once the joint is assembled, the solvent evaporates leaving behind a hardened resin and a joint that is more durable than the plastic pieces themselves. One suitable PVC cement is that provided by Hercules Chemical Co., Inc., in Passaic, N.J.

Figure 3:
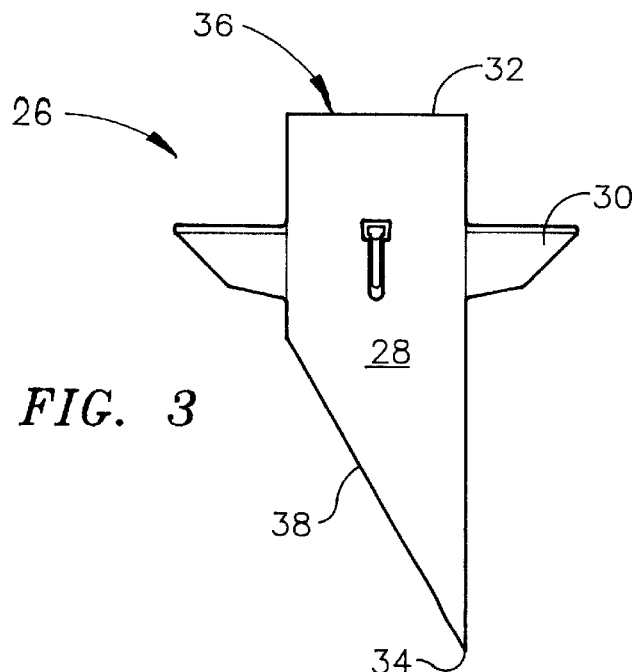
FIG. 3 is a side view of the base member.
Figure 4:
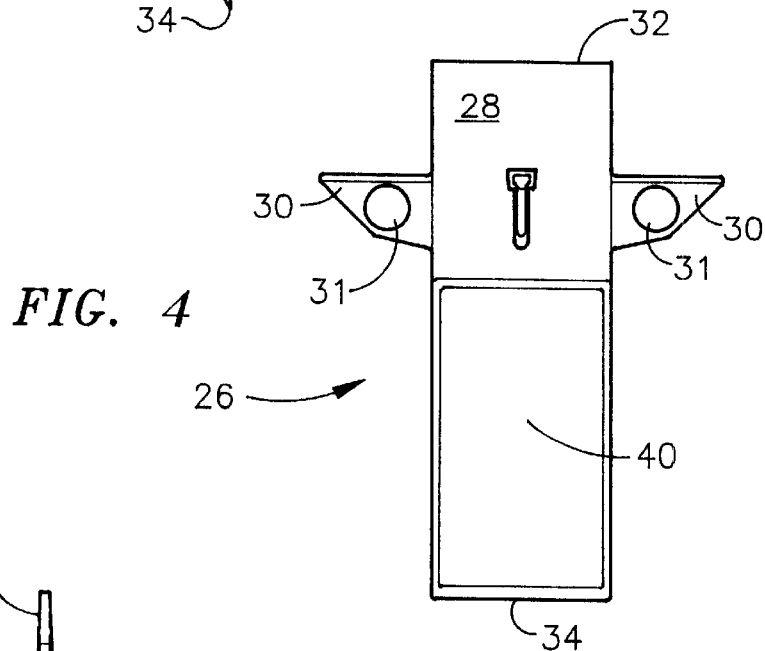
FIG. 4 is a side view of the base member depicting the base member of FIG. 3 rotated 90 degrees to the right.
Figure 5:
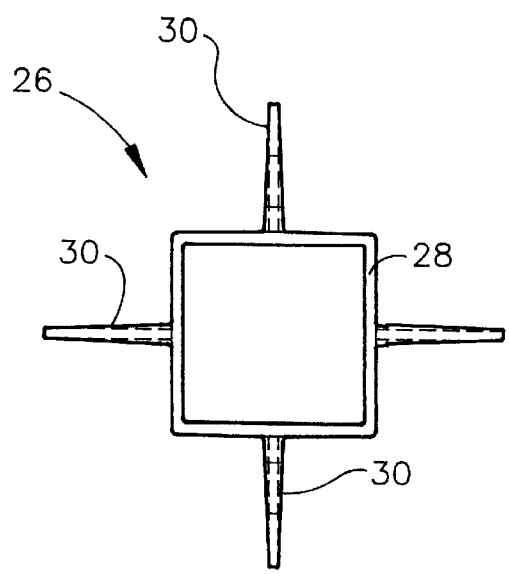
FIG. 5 is a top view of the base member.

Now referring to FIGS. 3 to 5, the base member 26 includes several radial projections 30 extending outwardly from the side walls 28. One or more of the radial projections 30 may include apertures 31. The apertures 31 are available to accept growing roots or insertion of rebar or similar reinforcing members to provide additional ground anchoring strength. The apertures 31 also reduce the amount of polymer required in the molding operation, thereby reducing production cost of the base member 26. A thicker body portion 33 is provided on the top edge of the radial projections 30 to increase strength and rigidity. Fillets 35 are provided at all edges of the junction of each radial projection 30 with the side walls 28 of the base member 26 to further increase the strength of the radial projections. A sharpened lower edge 37 is provided on the bottom edge of each radial projection 30 to enhance soil penetration ability. The length of each radial projection extending from the side wall 28 of the base member 26 to their distal ends 39 is typically at least 70% of the width of the base member 26. Therefore, for a typical embodiment in which the outer width of the base member is 3.25 inches, each radial projection 30 is at least 2.28 inches in length from the side wall 28 of the base member 26 to the distal end 39 of the radial projection 30.

The base member includes a top end 32 and a bottom end 34 with the top end having a planar top edge 36 and the bottom end 34 having a sharply sloped bottom edge 38. Since the base member 26 is hollow, the sloped bottom edge 38 creates a large entryway 40 for running cable (not shown) into the garden post. The base member is typically 12 inches in length, although longer lengths would be acceptable. The bottom 34 of the base member 26 is formed into a spike formed by removing the side walls 28 along an angled plane. The preferred angle of the plane with respect to the side walls is approximately 25 degrees, but may acceptably be between 20 and 40 degrees. This forms a large entryway 40 for the passage of cables (not shown) into the post. This large cable entryway 40 makes it very convenient to lead an underground electrical feed into the garden post, as the large opening is typically 3.0 inches wide by 7.5 inches long. If the post is buried a foot in the ground, cables buried from 5 inches to 12 inches deep will line up with the opening, making it easy and convenient to lead cables (not shown) into the entryway 40. As shown in the top view of FIG. 5, the base member 26 preferably includes four radial projections 30, with one extending from each side wall 28.

Figure 6:
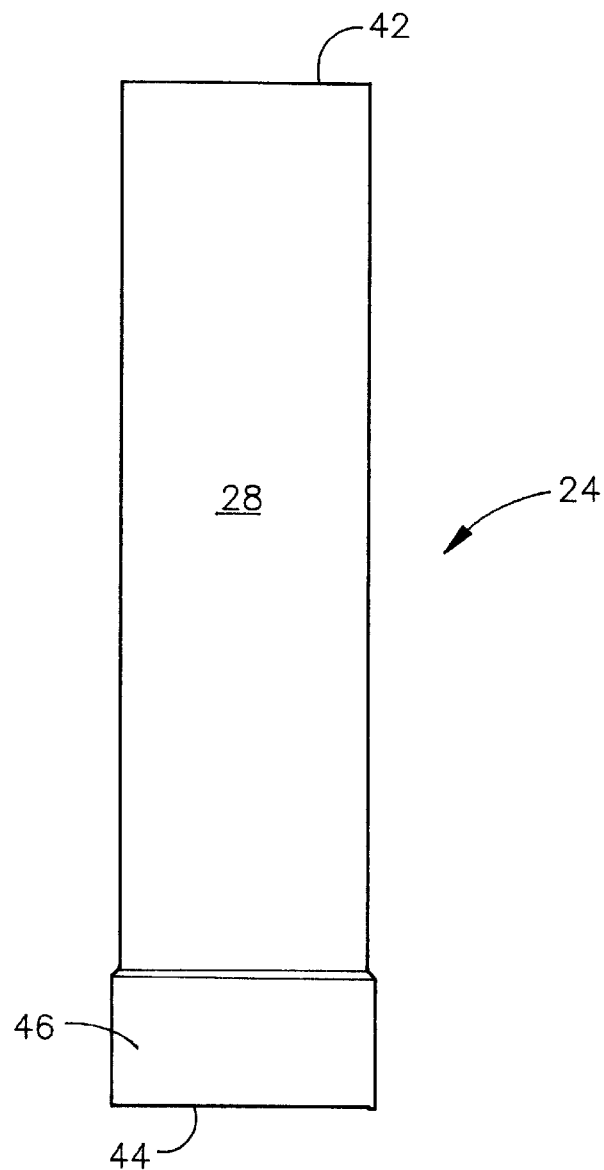
FIG. 6 is a plan view of the extender.
Figure 7:
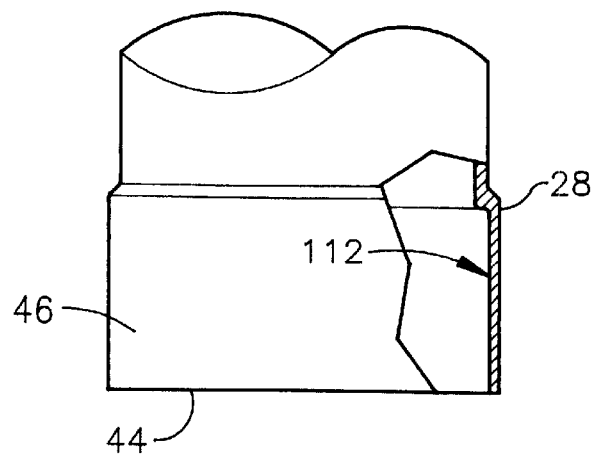
FIG. 7 is a side view of the collar portion of the extender of FIG. 6 with a portion of the side wall broken away.

Referring to FIGS. 6 and 7, the hollow elongated extender 24 includes a top end 42 and a bottom end 44. The side walls 28 on the bottom end 44 flare out to form an extender collar 46 that is of wider outer dimensions than the top portion of the extender 24. The wide extender collar 46 enables the bottom end 44 of the extender 24 (see FIG. 5) to fit over the top end 32 of the base member 26 (see FIG. 3).

Figure 8:
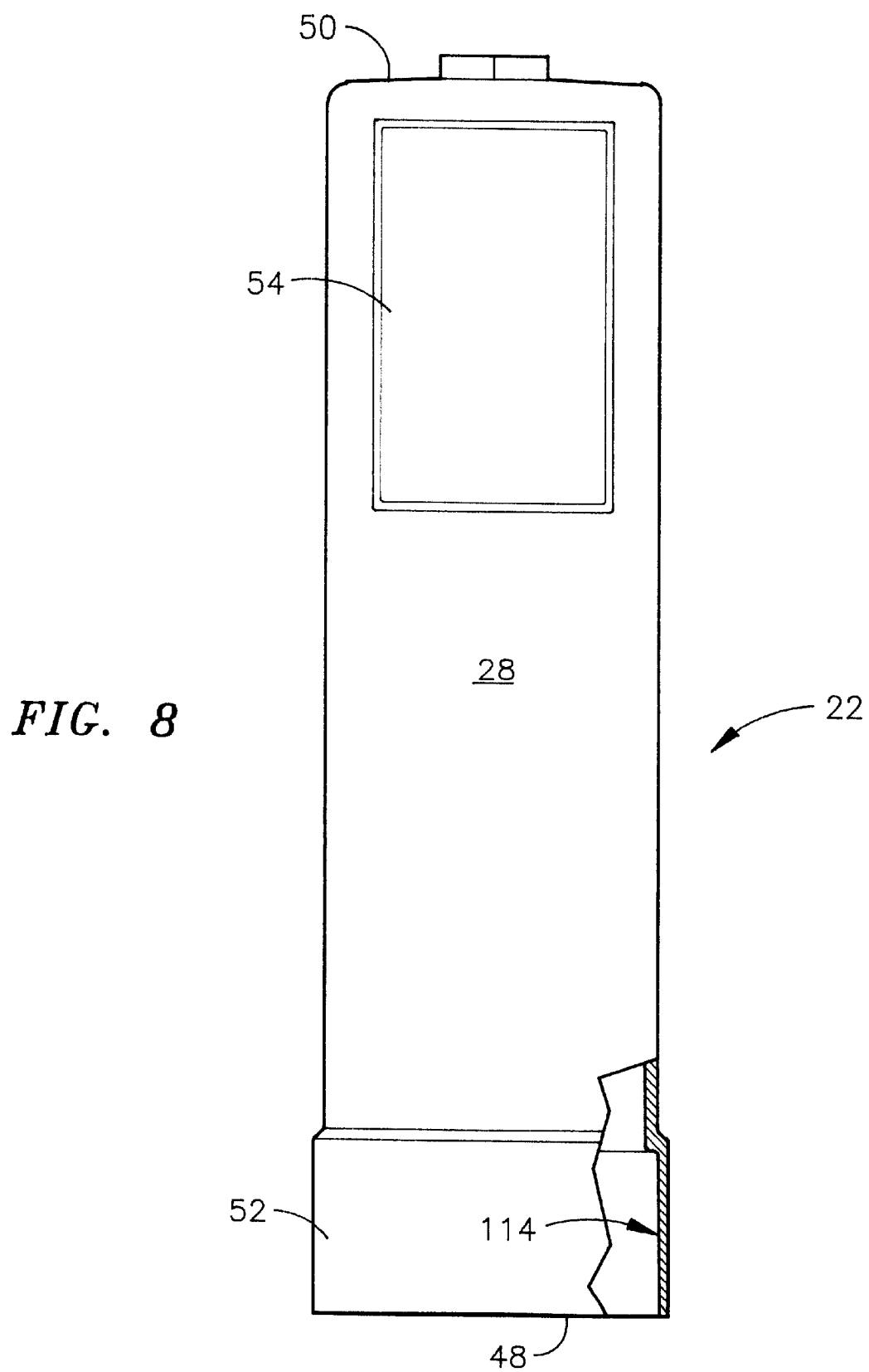
FIG. 8 is a plan view of the top member.

Referring now to FIG. 8, the hollow top member 22 with side walls 28 includes a bottom end 48 and a top end 50 with the bottom end flaring out to form a top member collar 52. The wide top member collar 52 enables the bottom end 48 of the top member 22 to fit over the top end 32 of the base member 26 (see FIG. 3) or the top end 42 of the extender 24 (see FIG. 5). The side walls 28 are removed on one side of the top member 22 to form an access portal 54. The top member preferably is 24 inches long, but there are no restrictions to its length as it could easily be molded in other lengths.

Figure 9:
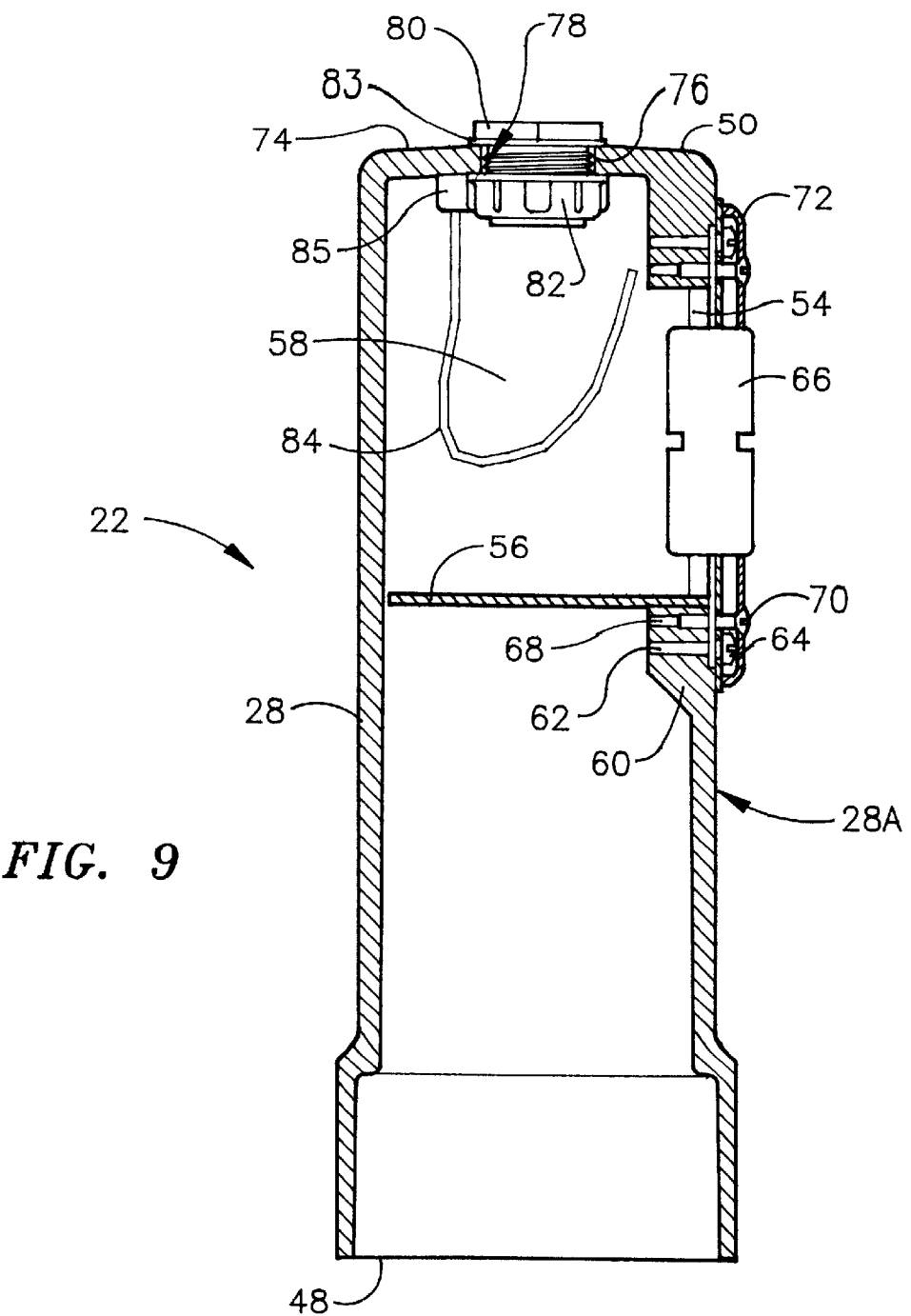
FIG. 9 is a sectional view of the top member shown in FIG. 8.

Now referring to FIG. 9, a sectional view depicts the hollow top member 22 with a shelf 56 installed therein to form an UL-listed junction box 58 at its top end 50. The junction box 58 is completely bounded by the side walls 28 of the top member 22 and the shelf 56 with an access portal 54 formed in one of the side walls 28. Thick wall sections 60 are formed in the center of the front side 28A. The thick wall sections 60 include apertures 62 to accept fasteners 64 for securing the ears of an electrical device, such as a duplex receptacle 66 and additional apertures 68 to accept fasteners 70 for securing a cover plate 72 as shown. The top wall 74 of the top member 22 includes an aperture 76 that will accept a standard light fixture (not shown) or similar fixture. The inner wall 78 of the aperture 76 may contain female threads to accept the male threads of a standard fixture, or the inner wall 78 may have smooth walls as depicted in FIG. 8 and a bushing 80 secured thereto. The bushing 80 is typically internally threaded to accept a fixture. Preferably, the interior threads of the bushing are ½-inch NPT size, which will accept the ½-inch exterior threads that are typically provided on most standard fixtures (not shown). The lower end of the bushing 80 has exterior threads that extend through the top wall 74 and is secured by a correspondingly mated nut 82 on the interior of the top member 22. A bushing gasket 83 is typically provided between the bushing 80 and the outer surface of the top wall 74 to make the bushing watertight with the top member 22. A ground wire 84 is secured to a grounding lug 85 that extends from the nut 82 into a junction box 58 formed by the shelf 56 that is secured to the top member 22.

According to a preferred embodiment of the garden post according to the present invention, the junction box 58 typically measures 2.8 inches across by 3.9 inches long by 2.8 inches deep. These dimensions provide a junction box 58 that contains enough volume to accommodate any typical box mounted electrical device, including standard GFCI wiring devices. Sufficient clearance is provided around the GFCI device and at least 2.0 inches depth behind it for accommodating the wiring connections. The access portal 54 leading into the junction box 58 is typically 2.2 inches across by 3.3 inches long, also sized to accommodate a GFCI device or any other standard electrical device.

Figure 10:
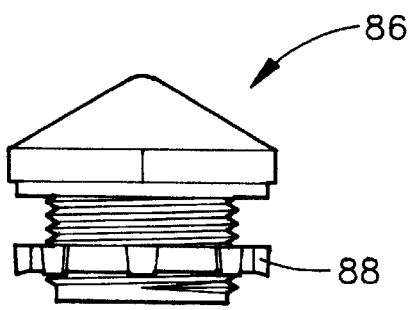
FIG. 10 is a side view of a cap and sealing member used in the present invention.

FIG. 10 depicts a cap 86 that is used to close off the aperture 76 in the top wall 74 in those situations in which the garden post is used only for supporting an installed electrical device in the junction box 58, and no fixture. The cap 86 is threaded and secured to the top wall 74 by a cap nut 88. The cap 86 is provided with the outdoor garden post to enable sealing and weatherproofing the top of the garden post in those instances in which a user prefers to use the post for an electrical device mounted in the junction box but does not intend to attach a fixture to the top bushing. The cap is threaded exteriorly and threads into the female threads of the bushing.

Figure 11:
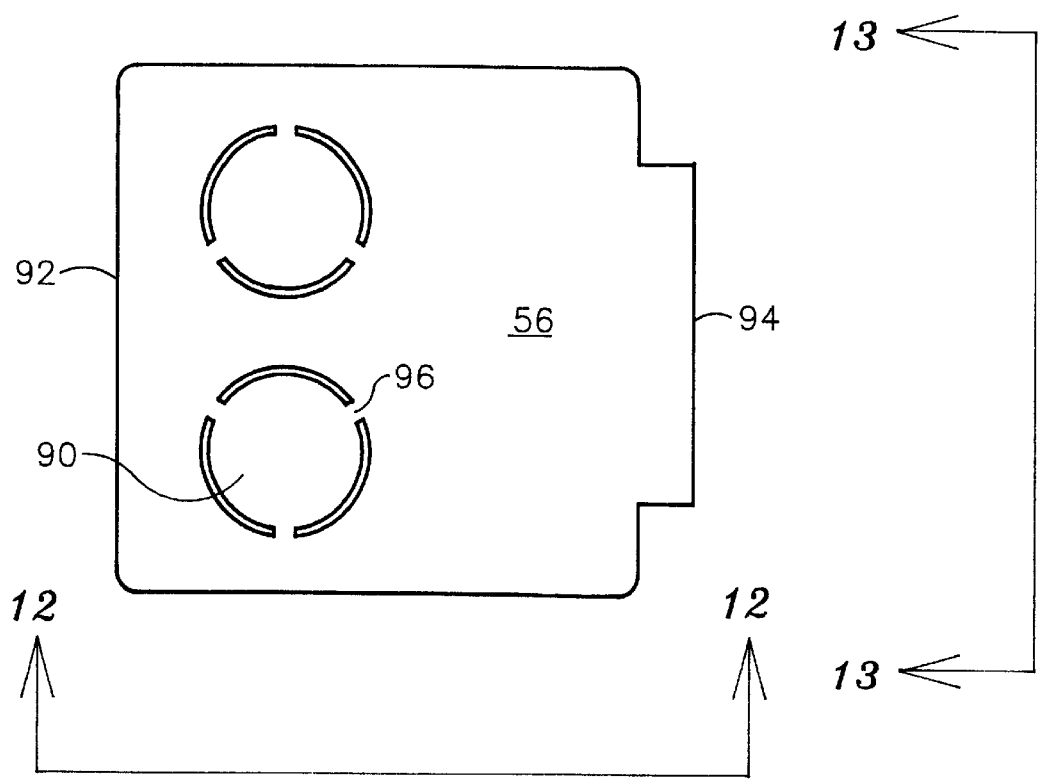
FIG. 11 is a plan view of the knockout plate used to form an electrical box in the top member.
Figure 12:
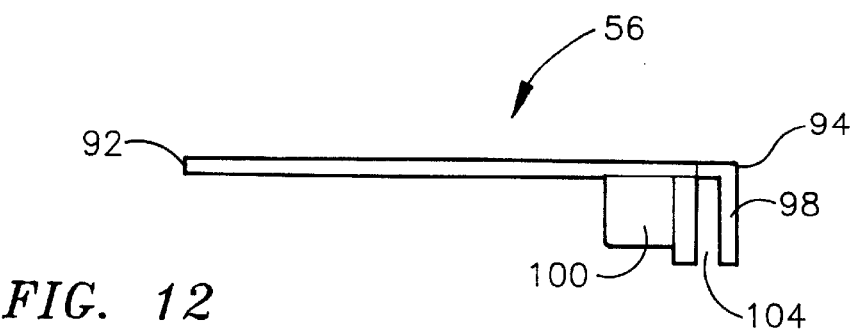
FIG. 12 is a side view of the knockout plate taken along line 12—12 in FIG. 11.
Figure 13:
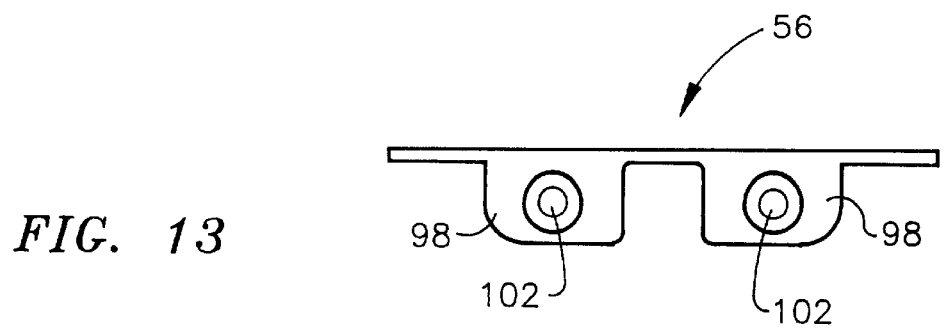
FIG. 13 is a side view of the knockout plate taken along line 13—13 in FIG. 11.

Referring now to FIGS. 11 through 13, the shelf 56 includes one or more areas where a portion of the shelf is removed to form knockouts 90. After the shelf is secured within the top member (not shown), the knockouts 90 can be easily punched out of the shelf to provide electrical supply wiring to the junction box. The shelf 56 has an inner 92 and outer 94 end. Thin walled bridges 96 are provided in the shelf 56 to provide the wiring knockouts 90. The side view of the shelf 56 in FIG. 12 depicts the outer end 94 with a lip 98 and a boss 100. As shown in FIG. 13, a view of the shelf 56 from the right side of FIG. 11, two lips 98 are preferred along with their bosses 100 (one in view in FIG. 12). Coaxial apertures 102 are provided in the lips 98 and bosses 100 to accept fasteners (not shown). The gap 104 between the lips 98 and bosses 100, as shown in FIG. 12, accommodates the wall thickness of the elongated body (not shown) when fitted thereon.

Figure 15:
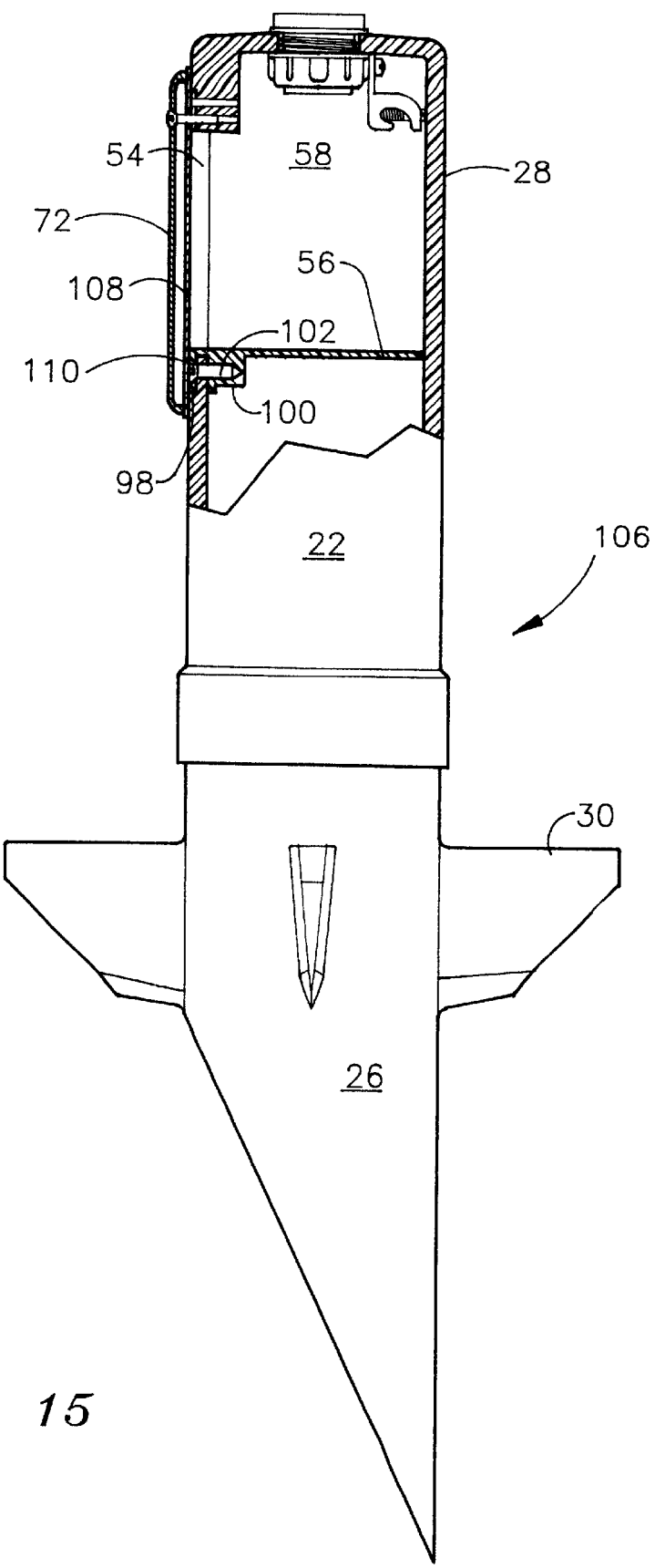
FIG. 15 is a side view of the short garden post of FIG. 14 according to the present invention with a portion of the top member cut away.

Referring to FIG. 15, a side view of a short garden post 106 with a portion of the side wall 28 broken away, a shelf 56 is shown extending from the bottom edge of the access portal 54 into the top member 22. The access portal 54 in the top member 22 is typically formed in the molding operation. As shown in FIG. 15, the garden post may be provided with a cover plate 72 and a gasket 108 sandwiched between the cover plate 72 and the side wall 28. The top member 22 is provided with a shelf 56 inserted therein to form a junction box 58 ready to accept a standard wall mounted electrical device such as a duplex receptacle. The shelf 56 is secured to the top member 22 by fasteners 110 secured through the shelf's lip 98, through coaxial apertures 102 in the side wall 28 of the top member 22, and into the boss 100 that is integral with the shelf 56. Line voltage or low voltage may be supplied to the junction box 58 by removing one or more of the knockouts (not shown) in the shelf 56 and drawing cable therein.

Figure 16:
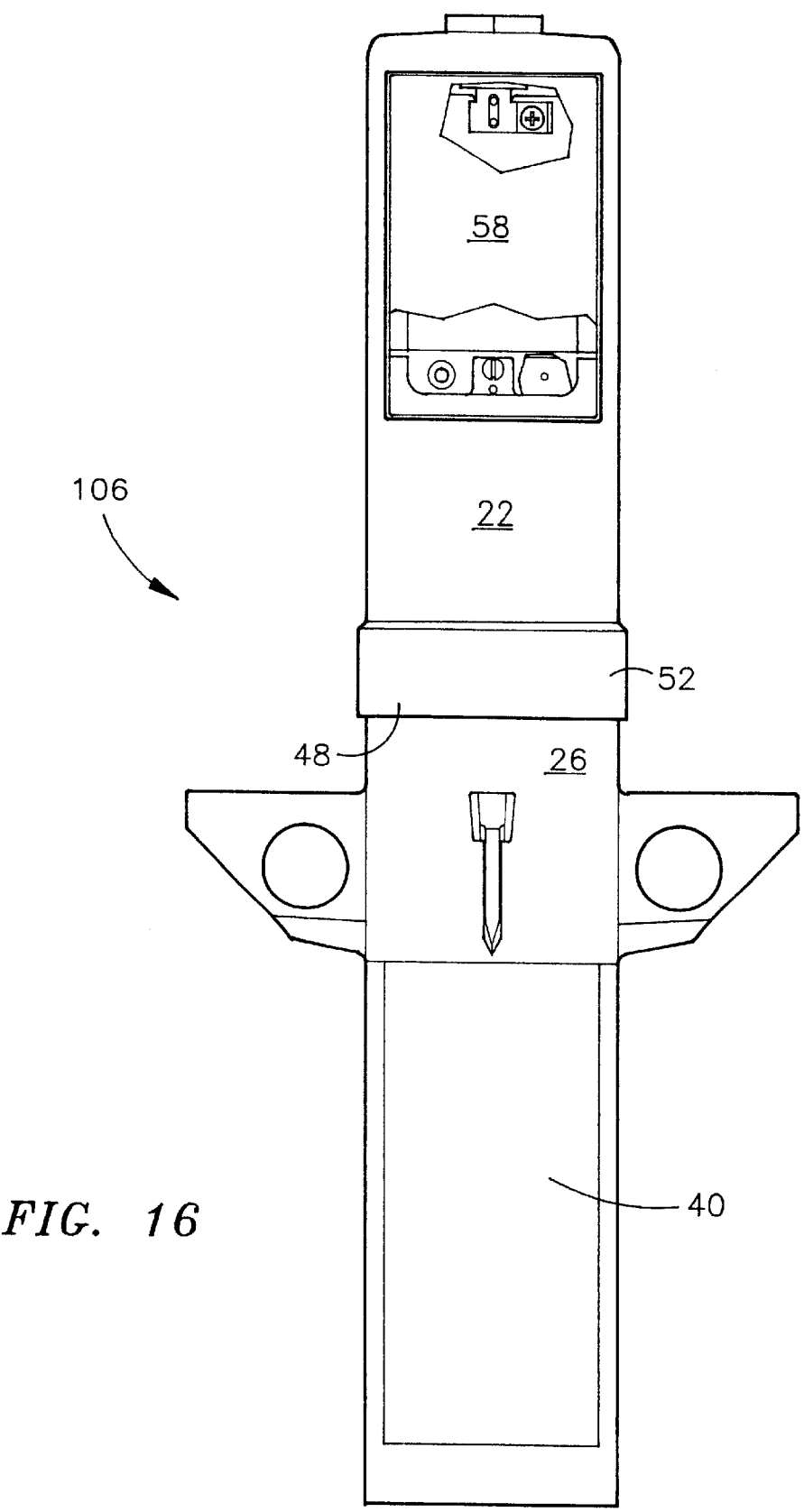
FIG. 16 is a front view of the short garden post of FIG. 14 garden post with the cover off and the access port to the junction box open.

Referring to FIG. 16, a front view of the short garden post 106 shows the top member 22 secured to the base member 26. The garden post of the present invention is supplied with a top member 22 and a base member 26, or all the required pieces to form a short garden post 106 according to the present invention. However, if a homeowner wishes to install a longer garden post to raise the height of a fixture or electrical device, then an extender 24 may be used for this purpose. A short garden post 106 such as shown in FIG. 16 may be assembled by applying PVC cement to the bottom end 48 of the top member 22 and the top end (obscured by the top member collar 52) of the base member 26, joining the two together, and holding them together for approximately 30 seconds. Set up time of the cement will vary with ambient conditions, with warmer temperatures and lower humidity hastening the curing time. Once glued with the PVC cement, the two pieces are strongly bonded together, with the joint typically stronger than the non-joint area.

Referring to FIGS. 7 and 8, the bottom end 44 of the extender 24 and the bottom end 48 of the top member 22 are flared to a size slightly larger than the outer dimensions of the non-flared portions of the extender 24 and base member 26. The non-flared portions of the top member 22, extender 24, and base member 26 are all preferably equal in dimension and are typically 4.000 inches wide across the outer walls. The dimension across the inner walls 112 of the flared portion of the extender 24 and the inner walls 114 of the flared portion top member 22 are equal and typically 4.062 inches. Therefore, when fitting the top member 22 on top of the base member 26 or on top of an extender 24, or the extender 24 on top of the base member 26 or on top of another extender 24, typically 0.031 inch of clearance is available between the inner walls of the flared section and the outer walls of the non-flared section of the pieces being joined. If the members are constructed of PVC, the PVC cement is typically spread on the inner walls of the flared portion and the outer walls of the top of the member it will be joined to. With the vertical overlap between the flared portion and the non-flared portion measuring typically 2.0 inches, a great deal of surface area is available between the two pieces for bonding. The flared portion is located on the bottom portion of the top piece to enable rainwater to run off the flared portion and away from the joint.

FIG. 1 depicts a preferred embodiment of a garden post of intermediate length 20 according to the present invention. A top member 22 is shown bonded to an extender 24, which in turn is bonded to a base member 26. An installer would typically first glue the top member 22, extender 24, and base member 26 together. A hole (not shown) would then be formed in the ground at the location desired for a fixture or electrical device. Underground electrical cable 116 would then be typically run to the hole. The cable 116 would then be run into the cable entryway 40. As long as the depth of the cable meets the local electrical codes, the depth is not critical as the entryway is typically 7.0 inches long and provides ample space for cable entry into the post. The bottom end 34 of the garden post 20 is then buried and the ground tamped to hold it securely in the ground. The radial projections 30 extend outwardly from the base member 26 and help to further anchor the post 20 in the ground. The top member 22 is typically 24 inches in length, the extender 24 typically 18 inches in length, and the base member 26 typically 12 inches in length. Therefore, with 2 inches vertical overlap at the top joint 118 and 2 inches vertical overlap at the bottom joint 120, the preferred embodiment of the intermediate length garden post 20 is typically 50 inches in length from the top end 50 of the top member 22 to the bottom end 34 of the base member 26. When buried to a depth of 14 inches, as shown by the ground level line 121 in FIG. 1, the intermediate length garden post 20 extends approximately 36 inches out of the ground. Additional extenders 24 may be added to increase the height of the garden post. Each additional extender 24 will add approximately 16 inches of length to the post. A garden post with two extenders would therefore extend typically about 52 inches from the ground, a garden post with three extenders would extend typically about 68 inches from the ground, etc. As additional extenders 24 are added to create a higher post however, a homeowner would typically bury the base end 34 further in the ground to better support the additional length.

FIG. 1 depicts the intermediate length garden post 20 with a light fixture 122 mounted on top and a duplex receptacle 124 mounted within the junction box. The garden post will accommodate a wide range of fixtures and electrical devices that are typically mounted in a landscape. Such fixtures and electrical devices include, but are not limited to, lighting fixtures, sensors such as rain gauges, light sensors, motion sensors, and infrared sensors, cameras, speakerphones, microphones, timers, receptacles, switches, ground fault circuit interrupt (GFCI) receptacles, and vibration detectors.

FIG. 2 depicts the manner in which the separate members are assembled to form a garden post of intermediate height 20 according to the present invention. An installer would typically secure the top member 22 to the extender 24 and the extender to the base member 26 with PVC cement. Typically the top member 22, extender 24, and base member 26 are assembled at the installation site. The shelf 56 is then typically removed to enable the cable 116 to be run easily through the assembled post 20. Cable is then typically run through the post 20 starting at the bottom 34, through the access portal 54, and then through a knockout in the shelf 56. The shelf 56 is then slipped into place at the bottom of the access portal 54 and secured with fasteners 110 to form the junction box 58 at the top of the top member 22. The garden post 20 is then placed in the ground and the hole backfilled and packed to hold the post securely. A fixture, such as the light fixture 122 shown in FIG. 2, can then be screwed into the bushing 80 on top of the assembled and anchored post 20. Wiring connections can then be completed to the fixture and, if desired, to an electrical device, such as the duplex receptacle 124 shown in FIG. 2. The electrical device is then secured with fasteners 64. A cover gasket 108 and a cover plate 72 are then secured over the electrical device 124 with fasteners 70 to create a sealed and watertight junction box and thereby complete the installation. The junction box 58 is sized large enough to accept ground fault receptacles and any standard wall mounted electrical device.

Figure 14:
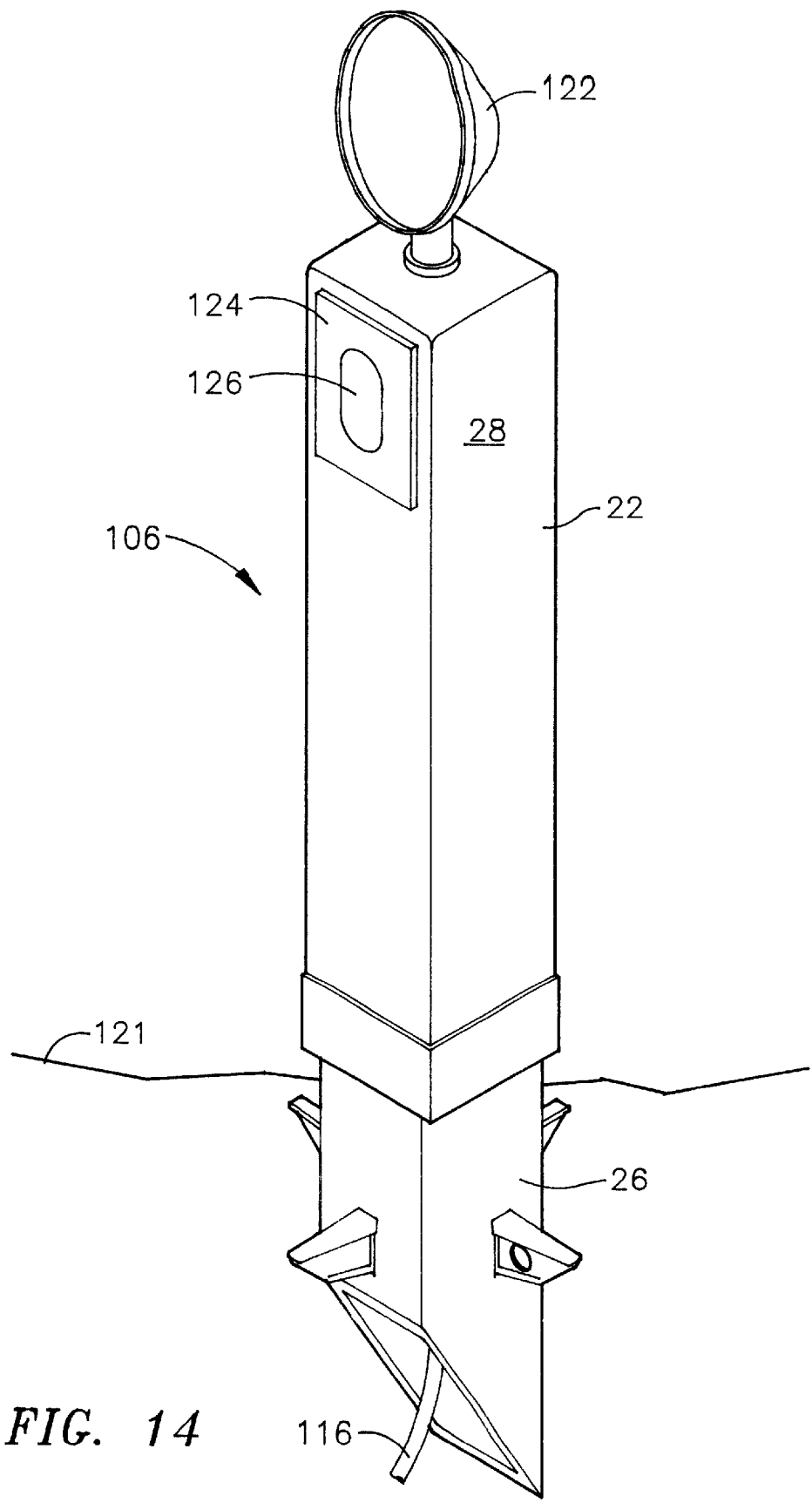
FIG. 14 is a perspective view of a preferred embodiment of a short garden post according to the present invention.

Referring now to FIG. 14, a preferred embodiment of the short garden post 106 according to the present invention is shown. The short garden post 106 is formed by securing a top member 22 and a base member 26 with PVC cement, or other appropriate cement compatible with the material of construction. FIG. 14 depicts a light fixture 122 mounted on top of the short post 106 with a photocell 126 mounted in the junction box to control the illumination of the light 122 based on the ambient lighting conditions.

As described herein, a garden post according to this disclosure can be constructed of many different heights, such as short, intermediate, or tall, by installing additional extenders between the top member and base member. Therefore, additional stability may be required to anchor the garden post into the ground as the height is increased. The length of the radial projections extending from the side wall of the base member to their distal ends is typically at least 70% of the width of the base member. It is desirable and acceptable to provide alternative embodiments of the base member in which the radial projections extend even further from the side walls of the base member to provide additional stability and a better ground anchor for taller embodiments of the garden post.

The garden post is designed and constructed to accept line voltage, or 120-volt power, and devices and fixtures requiring line voltage. However, it also may easily be used for low-voltage lights and fixtures if preferred.

Suitable gasket materials may be any of the commonly available flexible waterproof materials, such as rubber (natural or synthetic), Neoprene™, Santoprene™, or other flexible and deformable polymeric materials.

While the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. An electrical service apparatus for outdoor use, comprising:
    a top member including a rigid, hollow, elongated body having side walls with an integral closed top and an open bottom;
    a base member including a rigid, hollow, elongated body having side walls with an open top;
    one or more optional extenders, said extenders including a rigid, hollow, elongated body having side walls with an open top and an open bottom, said extender matching the geometrical shape of said side walls of said top member and said side walls of said base member;
    one or more collars integral with said top member and said extenders for connecting said top member and said optional extenders together with said base member;
    an access port with an opening formed in one of said side walls of said top member;
    a shelf secured in said electrical service apparatus below said access port with said shelf closing said hollow body of said top member;
    an electrical junction box formed within said electrical service apparatus by said side walls of said top member, said integral closed top, and said shelf;
    one or more sections formed in said shelf to enable easy knockout of said sections as desired for passage of cables; and
    a cover secured across said opening.

2. The electrical service apparatus of claim 1 wherein said collar includes inner walls spaced slightly larger than said side walls of said base member and said side walls of said extender such that an adhesive spread on said inner walls of said collar and on said side walls of said base member or on said side walls of said extender enables said top member to be secured to said base member in a permanent joint or one or more of said extenders to be secured between said top member and said base member with permanent joints there between.

3. An electrical service apparatus comprising:
    a top member including a rigid, hollow, elongated body having a side wall with a closed top and an open bottom;
    a base member including a rigid, hollow, elongated body having a side wall with an open top;
    a collar for connecting said top member and said base member;
    an access port with an opening formed in said side wall of said top member;
    a shelf secured at the bottom of said access port with said shelf closing said hollow body of said top member to form an electrical junction box near said closed top;
    one or more sections formed in said shelf to enable easy knockout of said sections as desired for passage of cables; and a cover secured across said opening
    one or more optional extenders secured between said top member and said base member,
    said extender including a rigid, hollow, elongated body having a side wall with an open top and an open bottom;
    said side wall of said extender matching the geometrical shape of said side walls of said top member and said side walls of said base member;
    said side wall of said extender spaced the same distance apart as said side wall of said top member and the side walls of said base member;
    said bottom of said extender including a collar for connecting said extender to said base member or to an adjacent extender;
    said collar on said extender including walls spaced slightly larger than the outer surfaces of said side walls of said base member such that said extender may be joined to said base member by spreading an adhesive on the inner surface of said collar of said extender and on the outer walls of said open top of said base member and joining said extender and said base member together; and
    said optional extender may be secured to a second extender by spreading an adhesive on the inner surface of said collar of said extender and on the outer walls of said open top of said second extender and joining said extender and said second extender together.

4. The electrical service apparatus of claim 1 wherein said extender may be joined to a second extender by spreading an adhesive on the inner surface of said collar of said extender and on the outer walls of said open top of said second extender and joining said extender and said second extender together.

5. The electrical service apparatus of claim 1 wherein said closed top includes an aperture and an electrically conductive bushing secured in said aperture.

6. The electrical service apparatus of claim 1, wherein said closed top of said top member includes an aperture having walls and interior threads formed along said walls.

7. The electrical service apparatus of claim 1, wherein said hollow elongated body is of a square cross section.

8. The electrical service apparatus of claim 1, wherein said side wall of said base member includes one or more integral radial projections extending outwardly therefrom.

9. The electrical service apparatus of claim 8, wherein said integral radial projections include apertures to allow roots to grow therein or supporting devices to be inserted therein for enhanced ground anchoring;
- a thicker body portion for increased rigidity of said projections;
- fillets integrally molded at the junction of said radial projections with said side wall of said base member for increased strength of said radial projections; and
- a sharpened lower edge for enhanced soil penetration ability.

10. The electrical service apparatus of claim 9, wherein said integral closed top of said top member is flat to accept a ram from a mechanical installation tool and thereby allow forceful insertion of said service apparatus into soil by said tool.

11. The electrical service apparatus of claim 5, wherein said bushing comprises a pipe threaded interiorly and exteriorly and secured to said top by a correspondingly mated nut on the interior of said hollow body.

12. The electrical service apparatus of claim 5 further comprising a fixture mounted to said bushing on said top of said elongated body.

13. The electrical service apparatus of claim 1 further comprising a plurality of integral bosses formed in the side walls of said top member, including one at the upper end of said access port and one at the lower end of said access port with each of said bosses including one or more apertures for securing an electrical device and for securing a complementary face plate for said electrical device.

14. The electrical service apparatus of claim 5 further comprising a fixture mounted to said bushing on said top of said elongated body and an electrical device secured in said junction box.

15. The electrical service apparatus of claim 13 wherein said apertures in said bosses are threaded to accept standard screws used for securing electrical devices and complementary face plates for said electrical devices.

16. The electrical service apparatus of claim 8 wherein the length of said radial projections extending from said side wall of said base member to their distal ends is at least 70% of the width of said elongated body of said base member.

17. The electrical service apparatus of claim 16 wherein the ratio of the length of said radial projections extending from said side wall of said base member to their distal ends to the width of said elongated body of said base member is increased as the length of said service apparatus is increased.

18. The electrical service apparatus of claim 2 wherein said joint formed between said top member and said base member includes no visible fasteners thereby making said joint aesthetically pleasing in appearance.

19. A method of providing a platform for the mounting of fixture and electrical devices comprising the steps of:
- providing a top member including a rigid, hollow, elongated body having parallel side walls with a closed top wall and a bushing secured in said top wall;
- providing one or more extenders including a rigid, hollow, elongated body having parallel side walls with an open top and an open bottom;
- providing a base member including a rigid, hollow, elongated body having parallel side walls with an open top and an open bottom;
- providing a bottom portion of said top member with a top member collar having side walls flared concentrically such that the inner walls of said top member collar are slightly larger than the outer walls of said extender and the outer walls of said base member;
- providing a bottom portion of said extender with an extender collar having side walls flared concentrically such that the inner walls of said extender collar are slightly larger than the outer walls of said extender and the outer walls of said base member;
- spreading an adhesive on said inner walls of said top member collar;
- spreading an adhesive on said outer walls of said open top of said extender;
- securing said top member to said extender by inserting said outer walls of said open top of said extender into said inner walls of said top member collar;
- holding said open top of said extender within said inner walls of said top member collar until said adhesive cures;
- spreading an adhesive on said inner walls of said extender collar;
- spreading an adhesive on said outer walls of said open top of said base member;
- securing said base member to said extender by inserting said outer walls of said open top of said base member into said inner walls of said extender collar; and holding said open top of said base member within said inner walls of said extender collar until said adhesive cures.

* * * * *